C. O. BODE.
DOUGH FORMING AND CUTTING MACHINE.
APPLICATION FILED FEB. 3, 1920.
1,373,791.                                                     Patented Apr. 5, 1921.
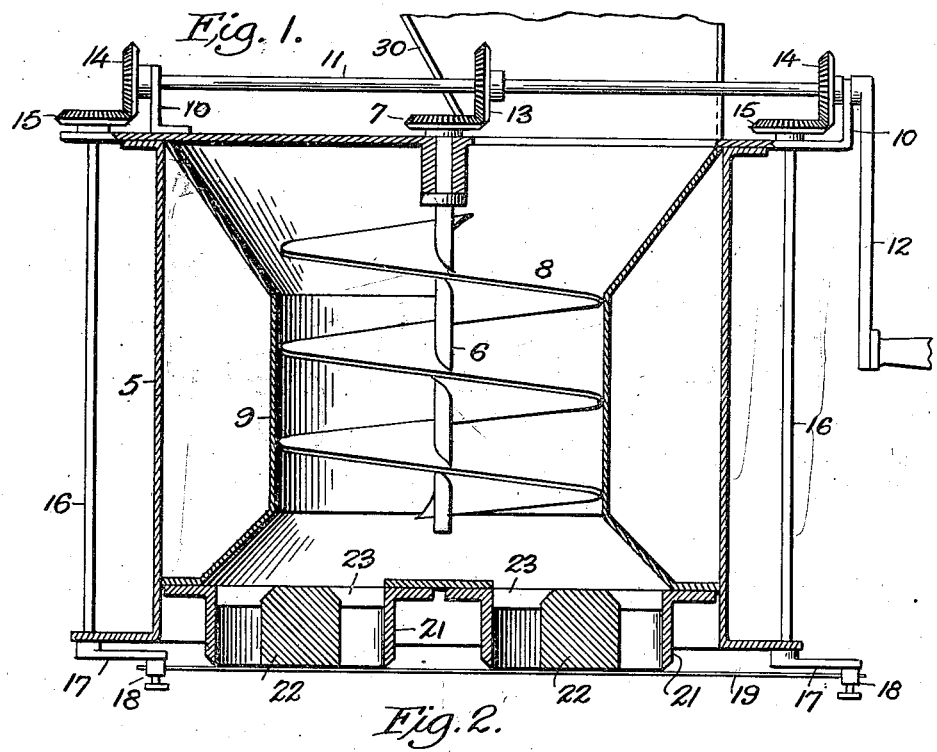
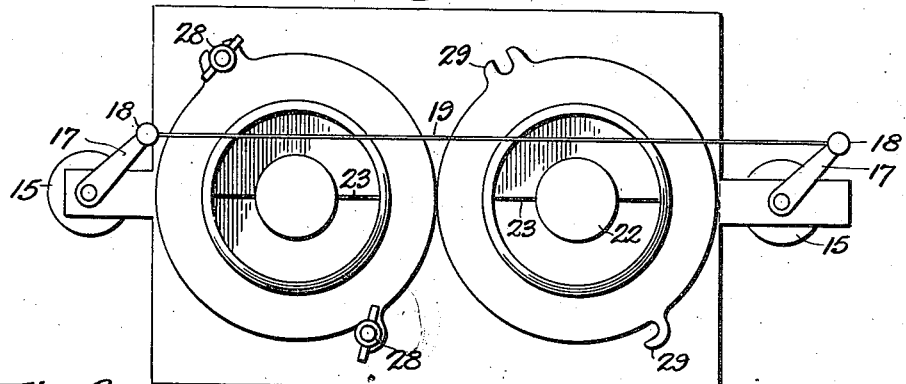
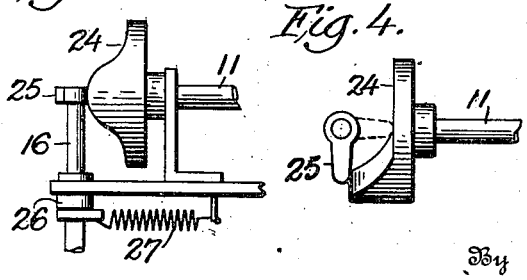
Inventor:
Charles O. Bode,
By James F. Duhamel,
Attorney

UNITED STATES PATENT OFFICE.

CHARLES O. BODE, OF NEW YORK, N. Y.

DOUGH FORMING AND CUTTING MACHINE.

1,373,791.   Specification of Letters Patent.   Patented Apr. 5, 1921.

Application filed February 3, 1920. Serial No. 355,895.

*To all whom it may concern:*

Be it known that I, CHARLES O. BODE, a citizen of the United States, and residing at New York, New York county, and New York State, have invented certain new and useful Improvements in Dough Forming and Cutting Machines, of which the following is a specification.

This invention relates to bread and cake cutting apparatus and more especially to what is commonly known as doughnut and cruller machines and has for its object the collecting, forcing and feeding of the dough through dies to form it into a tube like mass and to cut it off in appropriate lengths as rings, the details and the objects of the invention being more fully explained in the following specification, set forth in the appended claims and illustrated in the accompanying drawings, wherein:—

Figure 1 is a vertical sectional view,

Fig. 2 is a bottom plan view,

Figs. 3 and 4 are details of a modified means for operating the knife.

The device is adapted to be hung on a wall bracket and consists of a box 5, in which is suspended a vertical spindle 6, with a beveled gear wheel 7, at its upper end and carrying the screw conveyer 8, that plays within a cylinder 9, having flared upper and lower ends.

On the top of the box are two brackets 10, in which is journaled a shaft 11, with a crank arm 12 and carrying beveled gear wheels 13 and 14, the former wheel meshing with the wheel 7 to rotate the screw conveyer 8 and the latter gear wheels 14, to drive similar wheels 15, on the upper ends of the vertical shafts 16, whose lower ends carry crank arms 17 with binding posts 18, at their outer ends and these posts carry the wire 19, which plays over the lower side of the box 5, as the arms rotate to cut the dough into appropriate lengths.

The bottom 20, of the box is perforated and about the lower sides of these openings are the dies for the doughnut consisting of rings 21, in the center of which are hubs 22, that are supported by the blades 23, and permit the dough to pass through the annular space but the said dough immediately closes and again becomes one homogeneous part by the time it reaches the bottom of the die where it is encountered by the wire knife 19, and cut into a ring which may be dropped directly into the appropriate pan or pot for cooking.

The parts are susceptible of variations and Figs. 3 and 4, show how the gear wheels 14, and 15, may be dispensed with and the shaft 11, be provided with cams 24, which as they rotate, will rock the arms 25, at the upper ends of shafts 16. The arms 25, are held in contact with the cams by arms 26, below the top of the box and under tension of the springs 27.

The dies are interchangeable and are readily removable, being secured by the bolts and winged nuts 28, in conjunction with the slotted lugs 29, and by this means dies for various forms of crackers, biscuits, and cakes may be placed in the lower end of the box, so that the various forms of dough may be turned out at will.

The upper end of the box has an opening above which is located a hopper 30, into which the dough is placed and by proportioning the outlets of the dies with the feed of the screw 8, the completed ring of dough may be given the proper body and consistency for a certain size doughnut.

As the arms 17, rotate the wire knife is reciprocated over the lower end of the box and with each rotation of the arm, the wire cuts off two rings from each batch of dough, so that the screw must maintain a constant feed. In the modified form of knife, it is operated by but one revolution of the shaft 11.

It is obvious that other arrangements or modifications of the parts may be resorted to without departing from the essential features above described or from the scope of the appended claims.

What I claim as new is:

1. In a dough former and cutter, the combination of a box having a contracted passage-way, a hopper at the top of the passage-way, a flaring lower end to the passage-way, a feeding screw in the passage-way, a plurality of outlets for the flaring lower end, a knife common to all the openings and adapted to cut the dough leaving the outlets, gearing operating the screw and the knife, and a handle above the box to actuate the gearing.

2. In a dough former and cutter, the combination of a box, a cylindrical container forming a passage way for the dough and contracted at its middle and having flaring ends, a screw in the contracted part of the container, outlets in the container below the lower flaring ends, dies in the outlets at the bottom of the container, a shaft carrying the screw and supported at the upper end of the passage way, a knife beneath the dies, shafts at the sides of the box and having arms to carry and reciprocate the knife, and a shaft and handle to turn the screw shaft and the knife shafts.

In testimony whereof, I have signed my name to this specification in the presence of two subscribing witnesses, this 17th day of January, 1920.

CHARLES O. BODE.

Witnesses:
JAMES F. DUHAMEL,
CHARLES C. BRICKNER.